United States Patent
Momen et al.

(10) Patent No.: US 11,496,015 B2
(45) Date of Patent: Nov. 8, 2022

(54) ELECTRIC MACHINE WITH STATOR TOOTH TIP PROFILE FOR REDUCING WINDING-BASED POWER LOSSES

(71) Applicant: GM Global Technology Operations LLC, Detroit, MI (US)

(72) Inventors: Mohammad F. Momen, Rochester Hills, MI (US); Khwaja M. Rahman, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 699 days.

(21) Appl. No.: 16/429,828

(22) Filed: Jun. 3, 2019

(65) Prior Publication Data

US 2020/0381972 A1 Dec. 3, 2020

(51) Int. Cl.
*H02K 3/42* (2006.01)
*H02K 1/16* (2006.01)
*H02K 7/00* (2006.01)
*H02K 11/00* (2016.01)
*H02K 11/33* (2016.01)
(Continued)

(52) U.S. Cl.
CPC ................. *H02K 3/42* (2013.01); *B60K 1/04* (2013.01); *B60L 50/60* (2019.02); *H02K 1/16* (2013.01); *H02K 7/006* (2013.01); *H02K 11/0094* (2013.01); *H02K 11/33* (2016.01); *H02K 21/14* (2013.01); *B60Y 2200/91* (2013.01); *B60Y 2400/60* (2013.01); *H02K 2201/03* (2013.01)

(58) Field of Classification Search
CPC ............ H02K 3/42; H02K 1/16; H02K 1/165; H02K 1/185; H02K 21/025; H02K 21/14; H02K 11/33; H02K 11/0094; H02K 7/006; H02K 2201/03; B60L 50/60; B60K 1/04

See application file for complete search history.

(56) References Cited

U.S. PATENT DOCUMENTS

| | | | | |
|---|---|---|---|---|
| 5,220,228 A | * | 6/1993 | Sibata | H02K 21/16 310/156.46 |
| 8,664,826 B2 | * | 3/2014 | Krotsch | H02K 1/146 310/216.092 |

(Continued)

FOREIGN PATENT DOCUMENTS

| CN | 107171463 A | * | 9/2017 |
|---|---|---|---|
| CN | 107196430 A | * | 9/2017 |

(Continued)

*Primary Examiner* — Jeremy A Luks
(74) *Attorney, Agent, or Firm* — Quinn IP Law

(57) ABSTRACT

A rotary electric machine includes a rotor and a stator. The stator has windings and teeth extending radially from a stator core. Each tooth is separated from an adjacent tooth by a stator slot that opens to a radial stator-rotor airgap via a slot opening. The windings are positioned within each slot. Each stator tooth has a tooth tip with a surface profile configured to guide rotor flux away from areas of the windings proximate the respective slot opening. The tip surface profile may be a concave region, e.g., a dent/chamfer, and/or a convex region, e.g., a bump/bulge, and is formed in a distal end surface of the tip proximate the opening. The stator-rotor airgap is smaller at the convex region and larger at the concave region than elsewhere along the distal end surface. An electrical system includes the machine, a battery, and a power inverter module.

20 Claims, 4 Drawing Sheets

(51) Int. Cl.
    *B60K 1/04*     (2019.01)
    *B60L 50/60*     (2019.01)
    *H02K 21/14*     (2006.01)

(56)     References Cited

U.S. PATENT DOCUMENTS

2017/0063187 A1\*   3/2017   Hao ........................ H02K 21/14
2018/0367001 A1\*  12/2018   Shelton ................ H02K 15/022

FOREIGN PATENT DOCUMENTS

| CN | 108768003 | A | \* | 11/2018 | |
|---|---|---|---|---|---|
| CN | 110350746 | A | \* | 10/2019 | |
| CN | 110445337 | A | \* | 11/2019 | |
| CN | 112448491 | A | \* | 3/2021 | |
| CN | 112564319 | A | \* | 3/2021 | |
| EP | 1821388 | A2 | \* | 8/2007 | ............. H02K 3/325 |
| JP | 57101540 | A | \* | 6/1982 | ............... H02K 1/16 |
| JP | 2011234601 | A | \* | 11/2011 | |
| WO | WO-2019124950 | A1 | \* | 6/2019 | ........... H02K 1/2766 |
| WO | WO-2020003390 | A1 | \* | 1/2020 | ............. H02K 21/16 |

\* cited by examiner

ELECTRIC MACHINE WITH STATOR TOOTH TIP PROFILE FOR REDUCING WINDING-BASED POWER LOSSES

INTRODUCTION

Electric motor/generator units have a rotating member ("rotor") disposed with respect to a stationary member ("stator"). The rotor and stator are constructed of ferrous materials such as steel. Radially-projecting stator teeth are equally spaced around a circumferential surface of a stator core. Adjacent stator teeth are separated from each other by a stator slot. In order to construct stator windings for energizing the electric machine in a motoring mode, the stator teeth may be wound with lengths of conductive wire. Once fully wound, the wires substantially fill the stator slots. Alternatively, the stator slots may be filled by segments of a solid bar conductor, with copper being the most commonly used material in the construction of the stator windings.

In an alternating current (AC)/polyphase rotary electric machine, an AC input voltage is applied to the stator windings in order to generate a rotating stator field. The rotating stator field interacts with the rotor's magnetic field to produce and sustain tangential forces within a radial stator-rotor airgap, with such forces ultimately causing rotation of the rotor to occur. Resulting output torque on a rotor shaft may be harnessed via mechanical gear sets or pulleys and used to perform work within a system. Alternatively, the rotor may be caused to rotate with respect to an unpowered stator using torque from a prime mover, e.g., an internal combustion engine or a turbine. The time-varying rotor magnetic field generates an AC electric current in the proximate stator windings, with the generated current thereafter fed into a power inverter and used to recharge a battery pack or directly power an electrical device. It is desirable to minimize electrical power losses within such a rotary electric machine to optimize the machine's operating efficiency.

SUMMARY

The present disclosure relates generally to structural improvements configured to reduce power losses in a radial flux-type rotary electric machine having stator teeth that project radially from a ferrous stator core. Depending on the application, electric machines of this type may be called upon to operate at high rotational speeds. However, manufacturing limitations may necessitate a reduction in the overall number of stator slots or stator conductors within a given one of the stator slots, resulting in a larger conductor size.

The combination of higher rotational speeds of the rotor and larger conductor size within the individual stator slots increases winding AC-based power losses. The winding AC effect, which is also referred to in the general art of electromagnetism as the proximity and eddy effects, results from exposing closely-wound/larger conductors of the stator windings to the rotor field. The winding AC effect causes "current crowding" at the locus of the space-constrained turns or regions of the stator windings. Overall circuit resistance at such regions increases in a frequency-dependent manner, and thus power losses due to the winding AC effect tend to increase with increasing motor speeds.

It is recognized herein as a technical basis for the disclosed solutions that the stator winding-based power loss problem may be greater in conductors forming the stator windings that are located in close proximity to the radial stator-rotor airgap, i.e., closer to a respective slot opening between the stator-rotor airgap and each respective one of the above-noted stator slots. Winding AC losses are largely influenced by the rotor's magnetic flux cutting across the stator windings at a locus of the slot openings. The present approach is intended to reduce electrical power losses due to the above-described winding AC/proximity effect, with the disclosed improvements directed in particular to specially-configured stator tooth tips located at distal ends of the stator teeth as set forth in detail below.

The present teachings are applicable to various types of electric machines, including but not limited to permanent magnet, induction, wound-field synchronous, switched reluctance, and other rotary electric machines. In a non-limiting example embodiment, an electric machine includes a rotor and a stator. The rotor generates rotor flux. The stator is arranged concentrically with the rotor and is separated therefrom by a stator-rotor airgap. The stator includes a cylindrical stator core, stator windings positioned within a plurality of stator slots that open to the radial stator-rotor airgap via a respective slot opening, and a plurality of stator teeth separated from each other by a corresponding one of the stator slots. Each stator tooth extends radially from the cylindrical stator core, and has a corresponding tooth tip. Each tooth tip has a tip profile configured to guide the rotor flux away from predetermined areas or zones of the stator windings located proximate the respective slot opening for the subject tooth tip.

The tip profile for a given stator tooth tip may include a generally concave region formed along a distal end surface of the stator tooth, e.g., a dent in or a chamfer along the distal end surface, at a location that is proximate the respective slot opening. Such a tip profile ensures that a width of the stator-rotor airgap, as measured radially between the stator and the rotor, is larger at the locus of the concave region than elsewhere along the distal end surface. In some embodiments, the width of the radial stator-rotor airgap at the concave region, for a given stator tooth tip, is at least 15-percent larger than the width of the same radial stator-rotor airgap elsewhere along the distal end surface of the given stator tooth tip.

The tip profile may include a bulge, a bump, or another convex/raised region in the distal end surface extending toward the rotor, alone or in conjunction with the above-noted concave region. The convex region may be located immediately adjacent to the concave region when the concave and convex regions are used together, such that the width of the radial stator-rotor airgap is smaller at the locus of the convex region than elsewhere along the distal end surface. In such an embodiment, the width of the radial stator-rotor airgap at the locus of the convex region may be less than 85-percent of the size of the stator-rotor airgap elsewhere along the distal end surface of a given stator tooth.

The stator may surround the rotor in a possible configuration, such as by fully circumscribing the rotor. The rotor may be coupled to a driven member of a motor vehicle.

An electrical system is also disclosed herein that includes the above-described rotary electric machine, as well as a power inverter module (PIM) connected to a battery and configured to output a polyphase voltage. The stator windings positioned within each of the stator slots are driven via the polyphase voltage from the PIM.

A stator is also disclosed for use with a rotary electric machine. The stator is arranged concentrically with the rotor and is separated therefrom by a stator-rotor airgap. The stator includes a cylindrical stator core defining a plurality of stator slots, wherein each respective one of the stator slots opens to the stator-rotor airgap via a respective slot opening, and stator windings positioned within the plurality of stator slots. The stator also includes a plurality of stator teeth separated from each other by a corresponding one of the stator slots. Each stator tooth of extends radially from the cylindrical stator core and has a corresponding tooth tip. The corresponding tooth tip has a tip profile configured to guide the rotor flux away from predetermined areas or zones of the stator windings located proximate the respective slot opening to thereby reduce windings AC-based losses in the stator windings.

The rotor may be optionally coupled to a driven member of a vehicle in the various embodiments. For instance, the vehicle may be a motor vehicle having a drive axle and drive wheels, with the drive axle and drive wheels being the driven member in this embodiment.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
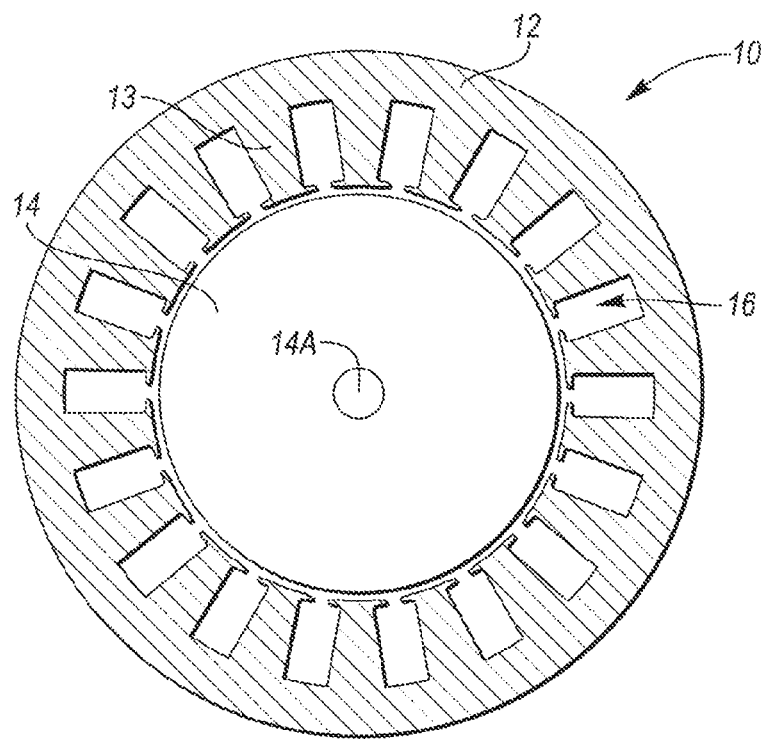
FIG. 1 is a schematic cross-sectional illustration of an example stator and rotor of a rotary electric machine, with the stator having stator teeth with distal ends or tips configured with a flux-guiding tip surface profile as set forth herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Figure 2:
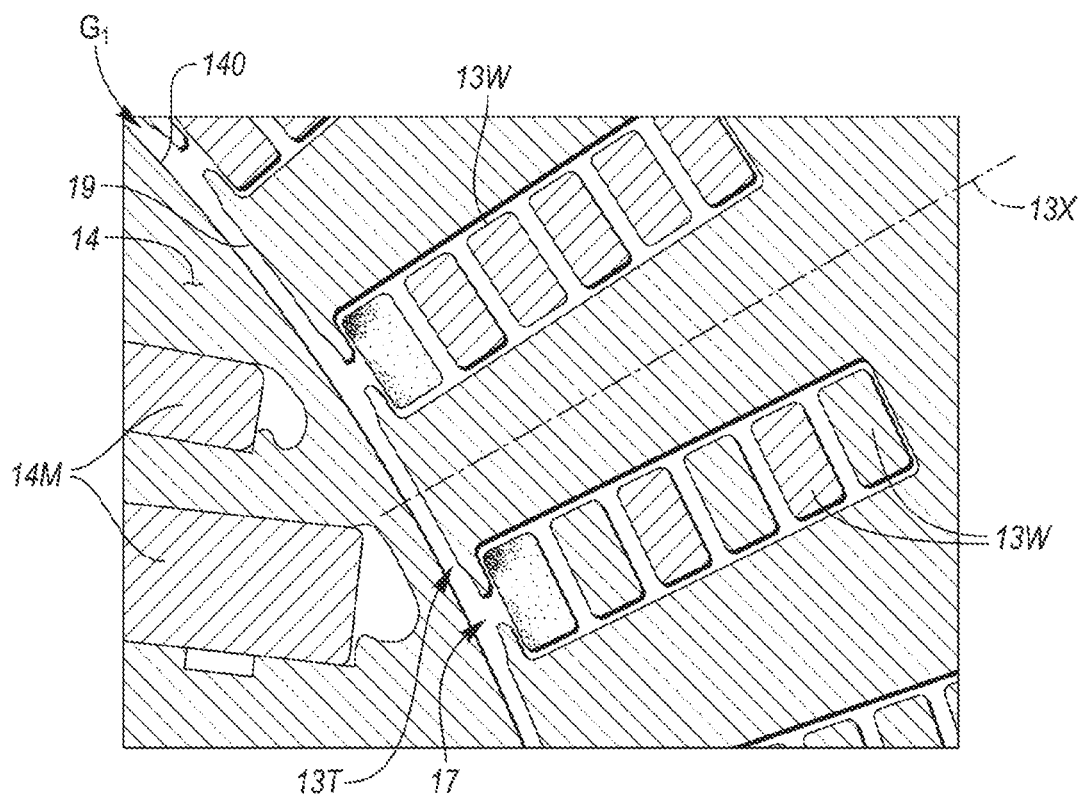
FIG. 2 is a schematic cross-sectional illustration of rotor flux distribution within a stator tooth having a tip surface profile providing reduced power losses due to the winding AC effect noted above.
Figure 3:
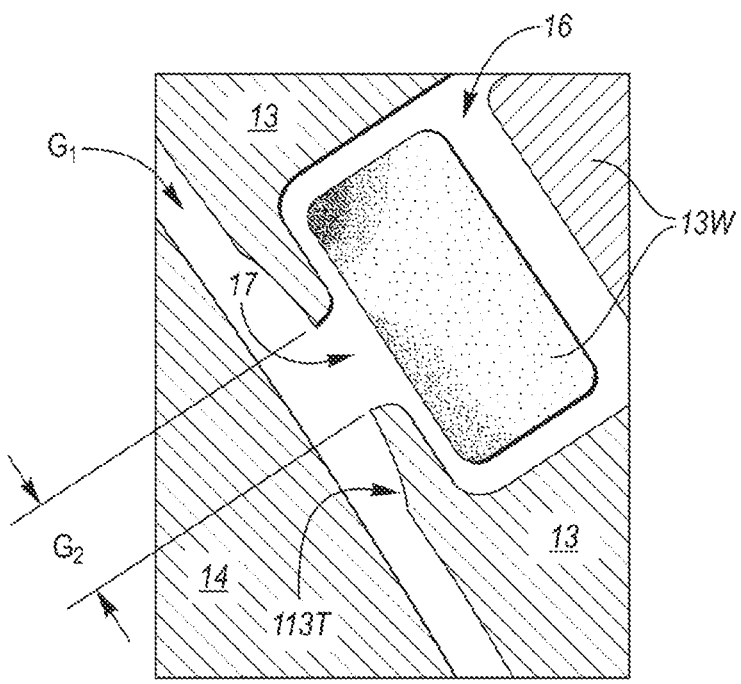
FIGS. 3 and 4 are schematic cross-sectional illustrations of embodiments of a stator tooth providing reduced power losses due to the winding AC effect, with the stator tooth being usable as part of the example rotary electric machine of FIG. 1.
Figure 4:
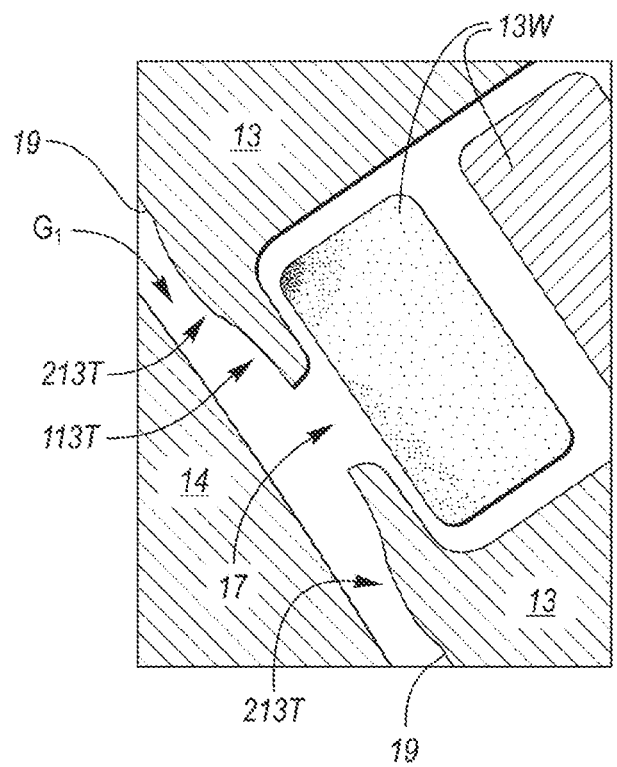

Referring to the drawings, wherein like reference numbers refer to the same or like components in the several Figures, an electric machine 10 is depicted schematically in FIG. 1. The electric machine 10 includes a stator (S) 12 and a rotor (R) 14. The rotor 14 is separated from the surrounding stator 12 by a radial stator-rotor airgap $G_1$, as best shown in FIGS. 2-4, such that the electric machine 10 is configured as a radial flux-type motor/generator unit. The rotor 14 in the illustrated embodiment is arranged concentrically with the stator 12, with the stator 12 circumscribing or surrounding the rotor 14. However, other embodiments may be realized in which the relative positions of the stator 12 and the rotor 14 are reversed, i.e., the rotor 14 may surround the stator 12. For illustrative consistency, the embodiment of FIG. 1 in which the rotor 14 resides radially within the stator 12 will be described hereinafter without limiting the construction to such a configuration.

Figure 6:
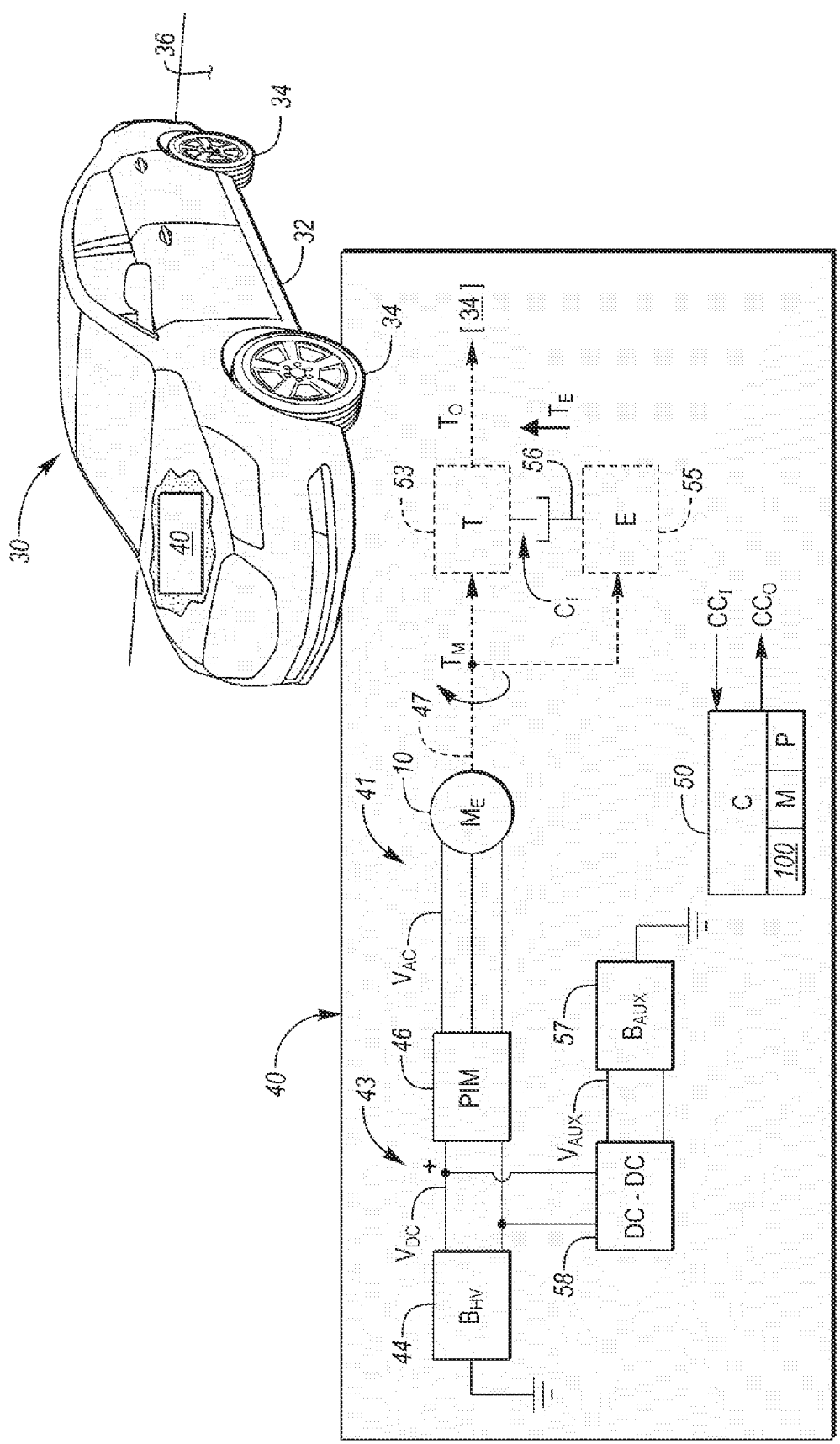
FIG. 6 is a schematic illustration of a motor vehicle having an electrical system that uses the rotary electric machine of FIG. 1 with either of the stator tooth profiles depicted in FIG. 3 or 4.

The rotor 14 may have surface-mounted and/or embedded rotor magnets 14M in some embodiments, which are omitted from FIG. 1 for simplicity but shown in FIGS. 2-4. When such rotor magnets 14M are used, the rotor magnets 14M may be embodied as permanent magnets that are surface-mounted to and/or embedded within individual laminations of the rotor 14. When the electric machine 10 of FIG. 1 is energized, e.g., using a battery 44 and power inverter module (PIM) 46 as shown in FIG. 6, the rotor 14 will begin rotating. Torque from such rotation is imparted to a connected rotor shaft 14A and thereafter applied to a coupled driven load, with one possible application of the generated torque described in detail below with reference to an example motor vehicle 30 in FIG. 6.

The stator 12 of FIG. 1 includes a plurality of radially-projecting stator teeth 13. Adjacent stator teeth 13 are separated from each other by a corresponding stator slot 16. The stator slots 16 are filled with an electrically conductive material, typically copper wires or bars, to thereby form stator windings 13W as depicted schematically in FIGS. 2-4. When the stator windings 13W are sequentially energized by an AC power supply, the stator windings 13W form stator electromagnets. Stator poles formed from the resulting rotating stator field of the energized stator windings 13W interact with rotor poles of the rotor magnets 14M (see FIG. 2) to rotate the rotor shaft 14A. The number, type, position, and/or relative orientation of permanent magnets used to form the rotor magnets 14M, which may vary with the application, ultimately influences how magnetic flux from the rotor 14 is directed into the stator 12.

A typical electric machine has a generally T-shaped stator tooth tip with a distal end surface that is equally spaced apart from a radially-outermost surface of a rotor, such that a stator-rotor airgap has a uniform width along the entirety of the distal end surface of a given stator tooth. Such construction may exacerbate the above-described potential problem of winding AC-based power losses in the conductors forming the stator windings. A solution to this problem is depicted in FIGS. 2-4.

Referring briefly to FIG. 2, portions of the stator windings 13W are located in close proximity to the radial stator-rotor airgap $G_1$, i.e., closer to a slot opening 17 connecting the radial stator-rotor airgap $G_1$ to the stator slots 16. In the depicted configuration, a distal end surface 19 of the stator tooth 13 is equally spaced apart from a radially-outermost surface 140 of the rotor 14, such that the radial stator-rotor airgap $G_1$ has a non-uniform width along the distal end surface 19 of a given stator tooth 13.

The present solutions of FIGS. 3 and 4 result from the recognition made herein that power losses occurring at higher rotational speeds of the rotor 14 are caused largely by rotor flux related to a rotor field emanating from the rotor magnets 14M cutting across the stator windings 13W at the locus of the slot opening 17, i.e., at or near the slot opening of a width $G_2$. As will be appreciated by one of ordinary skill in the art of electromagnetism, the magnetic field and flux of the rotor 14 are related properties of the rotor magnets 14M arranged on and/or in the ferrous material used to construct the rotor 14. Magnetic flux from the rotor 14 is the product of the average magnetic field of rotor 14 and a perpendicular area penetrated by such a magnetic field.

Relative Ohmic losses in the conductors forming the stator windings 13W are depicted by progressively lighter shaded areas which respectively represent higher (dark regions), medium, and lower (light regions) power losses. Winding AC losses due to the above-described eddy/proximity effect are most prevalent at conductor located nearest a junction between the stator tooth 13 and the tooth tip 13T, 113T, or 213T thereof, with the radial/longitudinal axis 13X of the stator tooth 13 generally orthogonal to the tooth tip 13T, 113T, and 213T in the various embodiments, not counting the concave or convex features described herein.

The baseline T-shaped tip profile of the tooth tip 13T shown in FIG. 2 is modified herein to help reduce such winding AC-related power losses, with two possible embodiments depicted in FIGS. 3 and 4. Each respective stator tooth 13 has a corresponding tooth tip 113T or 213T configured with a corresponding tip surface profile, with the surface profile configured to guide rotor flux away from predetermined areas or zones of the stator windings 13W located proximate the respective slot opening 17.

In the example embodiment of FIG. 3, for instance, the tip surface profile of the tooth tip 113T is a concave region, e.g., a dent or chamfer, in a direction away from the rotor 14. The tooth tip 113T with the concave region as its surface profile is formed on the distal end surface 19 of the stator tooth 13, i.e., the surface of the stator tooth 13 lying closest to the radial stator-rotor airgap $G_1$. The width of the radial stator-rotor airgap $G_1$ between the stator 12 and the rotor 14 along the length of the distal end surface 19 is thus larger at a locus of the concave region than elsewhere along the distal end surface 19. This in turn guides incident rotor flux away from predetermined regions or zones of the stator tooth 13, in this instance the junction between the tooth tip and the main portion of the stator tooth 13. Such an embodiment may be useful in reducing copper losses in the conductor(s)/stator windings 13W near the slot opening 17 by fifteen percent or more while negligibly impacting torque ripple and average torque from the electric machine 10, with an example of such improvement depicted in FIG. 5.

FIG. 4 includes an alternative tip profile of a tooth tip 213T that includes the above-noted dent, chamfer, or other concave region located near the slot opening 17. Additionally, the profile of the tooth tip 213T includes a convex region, such as a raised bump or bulge, which is formed in the distal end surface 19. When the convex region and concave region are used together, the convex region may be formed immediately adjacent to the concave region as shown. The additional ferrous material interposed between the rotor 14 and the stator tooth 13 helps guide more of the incident rotor flux away from the slot opening 17, with the airgap $G_1$ thus narrowing in close proximity to the convex region.

Copper losses in the conductors(s) near the slot openings 17 may be reduced by about fifty percent or possibly more in the example embodiment of FIG. 4, with the possible drawback of reducing the width of the radial stator-rotor airgap $G_1$. For instance, when the stator-rotor airgap $G_1$ has a width of 0.675 mm as measured between the rotor 14 and stator 12, the use of the tooth tip 213T may reduce the stator-rotor airgap $G_1$ to 0.54 mm, a reduction of about twenty percent. The tradeoff in overall performance of the electric machine 10 with the reduced size of the radial stator-rotor airgap $G_1$ is thus a tradeoff with the benefit of reduced electrical losses from the winding AC effect.

Figure 5:
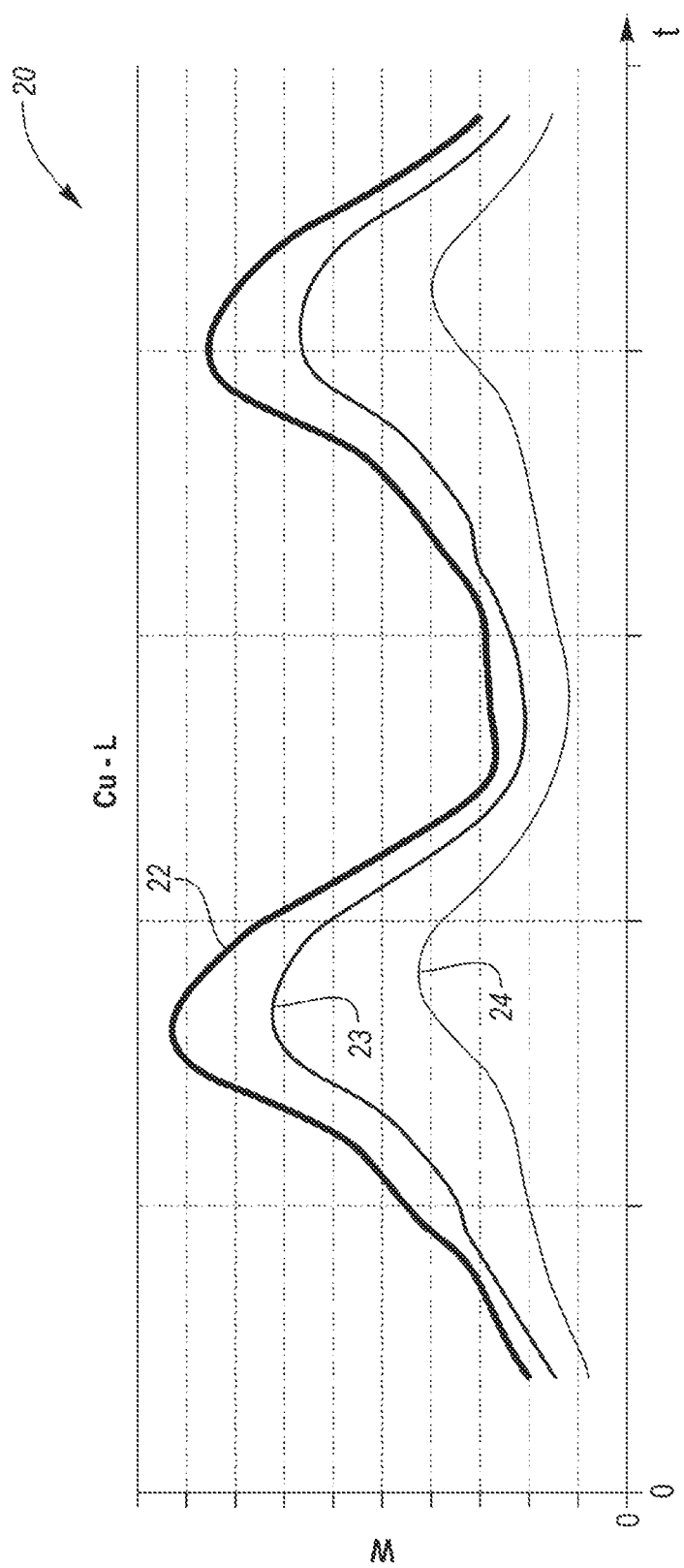
FIG. 5 is a representative time plot of relative power losses due to the winding AC effect for the example stator teeth shown in FIGS. 2, 3, and 4.

FIG. 5 depicts traces 20 depicting relative copper power losses (CU-L) over time (t) in watts (W) for the surface profiles embodied by the baseline tooth tip 13T of FIG. 2 (trace 22), tooth tip 113T of FIG. 3 (trace 23), and tooth tip 213T of FIG. 4 (trace 24). In an example application, trace 22 corresponds to a baseline power loss of 104.5 W using the baseline tip profile of tooth tip 13T, producing a peak torque of 275.3 Nm and torque ripple of 13.9 Nm. Substitution of the alternative tip profile of tooth tip 113T (FIG. 3) may reduce winding AC-related power losses by over twenty percent to about 83.1 W, producing a peak torque of 274.6 Nm and torque ripple of 13.8 Nm, both of which are considered herein to be negligible relative to the baseline performance of tooth tip 13T. The tip profile of tooth tip 213T as shown in FIG. 4 may further reduce such power losses to about 47.8 W, producing a peak torque of 276.2 Nm and torque ripple of 14.1 Nm, as shown in trace 24, which are likewise negligible relative to the baseline levels of trace 22.

Referring to FIG. 6, an electrical system 40 may be used as part of a vehicle 30 having a vehicle body 32, e.g., a motor vehicle having a set of road wheels 34 in rolling contact with a road surface 36. The electrical system 40 may also be used in other types of vehicles 30, for instance aircraft, watercraft, and rail vehicles, or in other mobile, non-vehicular applications such as robots and mobile platforms. Stationary applications may likewise benefit from use of the electrical system 40 as set forth below, and therefore the vehicle 30 of FIG. 6 is just one possible beneficial application of the present teachings.

The electrical system 40 includes the above-described rotary electric machine (ME) 10 of FIG. 1 having an output member 47 coupled to the rotor 13 (see FIGS. 3 and 4). In some powertrain embodiments the output member 47 is connected to a transmission (T) 53, e.g., one or more planetary gear sets, with output torque (arrow $T_O$) delivered to the road wheels 34. An internal combustion engine (E) 55 may be selectively connected to the transmission 53 via a clutch $C_1$ in an optional hybrid embodiment, such that engine torque (arrow $T_E$) is selectively delivered to the transmission 53 when the clutch $C_1$ is closed. The electrical system 40 includes a battery ($B_{HV}$) 44 and a power inverter module (PIM) 46. The battery 44 may have a relatively high voltage capacity, e.g., 60-volts or more depending on the embodiment, with "high-voltage" indicated by subscript "HV". The electric machine 10 may be embodied as a polyphase electric motor and thus electrically connected to an AC bus 41, with the electric machine 10 energized by an AC voltage ($V_{AC}$) from the PIM 46. The PIM 46 in turn is connected to the battery 44 via a DC voltage bus 43, with a DC voltage ($V_{DC}$) supplied by the DC voltage bus to the PIM 46 and vice versa depending on whether the electric machine 10 functions as a motor or as a generator. An auxiliary battery ($B_{AUX}$) 57 may be connected to the DC voltage bus 43 via a DC-DC converter 58 using an auxiliary voltage bus $V_{AUX}$ as shown, with the auxiliary voltage bus being a 12-15V bus in some embodiments.

When energized, the electric machine 10 generates output torque (arrow $T_M$) and delivers the same to a driven member/load via the output member 47, for instance to a connected drive axle and/or the drive wheels 34 of the vehicle 30. Responsive to input control signals (arrow $CC_I$), such as a requested discharging/motoring or charging/generating operating mode, operation of the electrical system 40 may be regulated by a controller (C) 50 via output control signals (arrow $CC_O$). The controller 50 may include a processor (P) and tangible, non-transitory memory (M), including read only memory in the form of optical, magnetic, or flash memory. The controller 50 may also include sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A rotary electric machine comprising:
   a rotor configured to provide rotor flux;
   a stator arranged concentrically with the rotor and separated therefrom by a radial stator-rotor airgap, wherein the stator includes a cylindrical stator core, stator windings positioned within a plurality of stator slots that open to the radial stator-rotor airgap via a respective slot opening, and a plurality of stator teeth separated from each other by a corresponding one of the stator slots, wherein each stator tooth of the plurality of stator teeth extends radially from the cylindrical stator core and has a corresponding tooth tip, the tooth tip having a tip profile configured to guide the rotor flux away from predetermined areas or zones of the stator windings located proximate the respective slot opening to thereby reduce windings AC-based losses in the stator windings; and
   wherein the tooth tip of each stator tooth includes a distal end surface having a central portion that spans between a pair of distal ends of the corresponding tooth tip, wherein the distal ends terminate at the respective slot opening, and wherein the central portion of the distal end surface of each stator tooth is a flat configuration spaced between the respective distal ends;
   wherein the tip profile of each tooth tip includes a convex region along the respective distal ends of the corresponding tooth tip in which a width of the radial stator-rotor rotor airgap is smaller at a locus of the convex region than elsewhere along the distal end surface of each stator tooth.

2. The rotary electric machine of claim 1, wherein the tip profile of each stator tooth includes a concave region disposed along the respective distal ends of the corresponding tooth tip proximate the respective slot opening, such that the width of the radial stator-rotor airgap is larger at a locus of the concave region than elsewhere along the distal end surface of each stator tooth.

3. The rotary electric machine of claim 2, wherein the width of the radial stator-rotor airgap at the locus of the concave region is at least 15-percent larger than the width of the radial stator-rotor airgap elsewhere along the distal end surface of each stator tooth.

4. The rotary electric machine of claim 2, wherein the convex region in the distal ends is adjacent to the concave region at the corresponding distal ends.

5. The rotary electric machine of claim 4, wherein the width of the radial stator-rotor airgap at the locus of the convex region is less than 85-percent of a size of the radial stator-rotor airgap elsewhere along the distal end surface of each stator tooth.

6. The rotary electric machine of claim 1, wherein the tip profile of each stator tooth includes a concave region disposed along the respective distal ends of the corresponding tooth tip proximate the respective slot opening and adjacent to the respective convex region, such that the width of the radial stator-rotor airgap between the stator and the rotor is larger at a locus of the concave region than elsewhere along the distal end surface of each stator tooth.

7. The rotary electric machine of claim 6, wherein the width of the radial stator-rotor airgap at the locus of the concave region is at least 15-percent larger than the width of the radial stator-rotor airgap elsewhere along the distal end surface of each stator tooth, and the width of the radial stator-rotor airgap at the locus of the convex region is less than 85-percent of a size of the radial stator-rotor airgap elsewhere along the distal end surface of each stator tooth.

8. The rotary electric machine of claim 1, wherein the stator surrounds the rotor.

9. The rotary electric machine of claim 1, wherein the rotor is coupled to a driven member of a motor vehicle.

10. An electrical system comprising:
    a battery;
    a power inverter module (PIM) connected to the battery and configured to output a polyphase voltage;
    a rotary electric machine connected to the battery via the PIM and including:
       a rotor having configured to generate rotor flux;
       a stator that is concentric with the rotor and separated therefrom by a radial stator-rotor airgap, the stator having stator windings, a cylindrical stator core, and a plurality of stator teeth each extending radially from the cylindrical stator core and separated from an adjacent stator tooth of the plurality of stator teeth by a corresponding stator slot, wherein the corresponding stator slot between the adjacent one of the stator teeth opens to the radial stator-rotor airgap via a respective slot opening, and the stator windings are positioned within each of the corresponding stator slot and driven via the polyphase voltage from the PIM;
    wherein each respective stator tooth of the plurality of stator teeth has a corresponding tooth tip with a tip profile configured to guide the rotor flux away from predetermined areas or zones of the stator windings located proximate the respective slot opening; and
    wherein the tooth tip of each stator tooth includes a distal end surface having a central portion that spans between a pair of distal ends of the corresponding tooth tip, wherein the distal ends terminate at the respective slot opening, and wherein the central portion of the distal end surface of each stator tooth is a flat configuration spaced between the respective distal ends such that the radial stator-rotor airgap is a consistent width along the flat configuration;
    wherein the tip profile of each tooth tip includes a convex region along the respective distal ends of the corresponding tooth tip in which a width of the radial stator-rotor airgap is smaller at a locus of the convex region than elsewhere along the distal end surface of each stator tooth.

11. The electrical system of claim 10, wherein the tip profile of each stator tooth includes a concave region formed as a dent or a chamfer in the distal ends of the corresponding tooth tip proximate the respective slot opening, such that the width of the radial stator-rotor airgap between the stator and the rotor is larger at a locus of the dent or the chamfer than elsewhere along the distal end surface of each stator tooth.

12. The electrical system of claim 11, wherein the width of the radial stator-rotor airgap at the locus of the dent or the chamfer is at least 15-percent larger than the width of the radial stator-rotor airgap elsewhere along the distal end surface of each stator tooth.

13. The electrical system of claim 11, wherein the convex region in the distal ends are adjacent to the dent or the chamfer.

14. The electrical system of claim 13, wherein the width of the radial stator-rotor airgap at the locus of the convex region is less than 85-percent of a size of the radial stator-rotor airgap elsewhere along the distal end surface of each stator tooth.

15. The electrical system of claim 10, wherein the tip profile of each stator tooth includes a concave region disposed along the respective distal ends of the corresponding tooth tip proximate the respective slot opening and adjacent to the convex region, such that the width of the radial stator-rotor airgap between the stator and the rotor is larger at a locus of the concave region than elsewhere along the distal end surface of each stator tooth.

16. The electrical system of claim 15, wherein the width of the radial stator-rotor airgap at the locus of the concave region is at least 15-percent larger than the width of the radial stator-rotor airgap elsewhere along the distal end surface of each stator tooth, and the width of the radial stator-rotor airgap at the locus of the convex region is less than 85-percent of a size of the radial stator-rotor airgap elsewhere along the distal end surface of each stator tooth.

17. The electrical system of claim 11, wherein the stator surrounds the rotor.

18. The electrical system of claim 11, wherein the rotor is coupled to a driven member of a vehicle.

19. The electrical system of claim 18, wherein the driven member is a drive axle and drive wheels of a motor vehicle.

20. A stator for use with a rotary electric machine having a rotor that produces rotor flux, the stator is arranged concentrically with the rotor and separated therefrom by a stator-rotor airgap, the stator comprising:
 a cylindrical stator core defining a plurality of stator slots, wherein each respective one of the stator slots opens to the stator-rotor airgap via a respective slot opening;
 stator windings positioned within the plurality of stator slots;
 a plurality of stator teeth separated from each other by a corresponding one of the stator slots;
 wherein each stator tooth of the plurality of stator teeth extends radially from the cylindrical stator core and has a corresponding tooth tip, and the corresponding tooth tip has a tip profile configured to guide the rotor flux away from predetermined areas or zones of the stator windings located proximate the respective slot opening to thereby reduce windings AC-based losses in the stator windings; and
 wherein the tooth tip of each stator tooth includes a distal end surface having a central portion that spans between a pair of distal ends of the corresponding tooth tip, wherein the distal ends terminate at the respective slot opening, and wherein the central portion of the distal end surface of each stator tooth is a flat configuration spaced between the respective distal ends;
 wherein the tip profile of each tooth tip includes a convex region along the respective distal ends of the corresponding tooth tip in which a width of the stator-rotor airgap is smaller at a locus of the convex region than elsewhere along the distal end surface of each stator tooth.

* * * * *